(12) United States Patent
Hertzog

(10) Patent No.: US 9,933,925 B2
(45) Date of Patent: Apr. 3, 2018

(54) SCREEN LAYOUT MANAGER

(71) Applicant: NEXThink S.A., Lausanne (CH)

(72) Inventor: Patrick Hertzog, Villars-sur-Glâne (CH)

(73) Assignee: NEXTHINK SA, Lausanne (CH)

( * ) Notice: Subject to any disclaimer, the term of this patent is extended or adjusted under 35 U.S.C. 154(b) by 274 days.

(21) Appl. No.: 14/644,521

(22) Filed: Mar. 11, 2015

(65) Prior Publication Data
US 2016/0267056 A1    Sep. 15, 2016

(51) Int. Cl.
G06F 3/0484 (2013.01)
G06F 3/0482 (2013.01)
G06F 9/44 (2018.01)

(52) U.S. Cl.
CPC ........ G06F 3/04842 (2013.01); G06F 3/0482 (2013.01); G06F 9/4443 (2013.01); *G06F 2203/04803* (2013.01)

(58) Field of Classification Search
CPC .............. G06F 3/04842; G06F 17/212; G06F 2203/04803; G06F 3/0482; G06F 3/04847; G06F 9/4443
See application file for complete search history.

(56) References Cited

U.S. PATENT DOCUMENTS 6,008,809 A * 12/1999 Brooks ................. G06F 3/0481
715/792
6,246,412 B1 * 6/2001 Shum ....................... G06T 15/10
345/419

(Continued)

OTHER PUBLICATIONS

A. Borning et al, Solving Linear Arithmetic Constraints for User Interface Applications; UIST 97; 10 pages.

(Continued)

*Primary Examiner* — Andrea Long
(74) *Attorney, Agent, or Firm* — Faegre Baker Daniels LLP

(57) ABSTRACT

An electronic layout manager system for displaying a plurality of visual elements in different sections of a screen of an electronic device or of a screen image projected by an electronic device, said sections being in the form of assembled square or rectangular tiles of various sizes that in combination fill a square or rectangular screen surface area, the system comprising a layout manager program module configured to define the size and position of each of the tiles as a function of constraints stored in a memory of the system or calculated by an algorithm of the program module, the program module configured to recursively subdivide said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H), the program module configured to automatically resize, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height.

6 Claims, 5 Drawing Sheets

(56) References Cited

U.S. PATENT DOCUMENTS

| | | | | |
|---|---|---|---|---|
| 8,065,627 B2* | 11/2011 | Atkins | ............... | G06F 17/509 715/788 |
| 8,291,314 B2* | 10/2012 | Atkins | ............... | G09G 5/14 715/234 |
| 9,152,292 B2* | 10/2015 | Xiao | ............... | G06F 3/0481 |
| 2003/0182649 A1* | 9/2003 | Harn | ............... | G06F 17/5072 716/123 |
| 2005/0044485 A1* | 2/2005 | Mondry | ............... | G06T 11/60 715/247 |
| 2007/0208996 A1* | 9/2007 | Berkner | ............... | G06F 17/212 715/210 |
| 2009/0089660 A1* | 4/2009 | Atkins | ............... | G06F 9/4443 715/243 |
| 2009/0139127 A1* | 6/2009 | Southard | ............... | A47G 1/065 40/761 |
| 2010/0199227 A1* | 8/2010 | Xiao | ............... | G06F 3/0481 715/863 |
| 2010/0275152 A1* | 10/2010 | Atkins | ............... | G06F 17/212 715/788 |
| 2010/0293501 A1* | 11/2010 | Russ | ............... | G06F 3/04886 715/803 |
| 2013/0125050 A1* | 5/2013 | Goshey | ............... | G06F 3/048 715/800 |
| 2013/0155069 A1* | 6/2013 | Borders | ............... | G06T 11/20 345/441 |
| 2014/0010461 A1* | 1/2014 | Sugai | ............... | G06T 11/60 382/206 |
| 2015/0371366 A1* | 12/2015 | Hilt | ............... | H04N 1/3877 382/284 |
| 2016/0092084 A1* | 3/2016 | Dyar | ............... | G06F 9/4443 715/765 |

OTHER PUBLICATIONS

G. Badros et al, 2002, The Cassowary Linear Arithmetic Constraint Solving Algorithm; ACM Transactions on Computer-Human Interaction; © 2002 ACM; pp. 1-30.

Noreen Jamil, Constraint Solvers for User Interface Layout; arXiv:1401.1031v1 [cs.HC]; Jan. 6, 2014; 7 pages.

T. Yanagida et al, 2009, Personalizing Graphical User Interfaces on Flexible Widget Layout; EICS' 09 Jul. 15-17, 2009; © 2009 ACM; 10 pages.

C. Zeidler et al, 2012, Constraint Solving for Beautiful User Interfaces How Solving Strategies Support Layout Aesthetics; CHINZ '12, Jul. 2-3, 2012, Dunedin, New Zealand; © 2012; ACM; 8 pages.

C. Zeidler et al, 2013, The Auckland Layout Editor: An Improved GUI Layout Specification Process; UIST'13; Oct. 8-11, 2013, St. Andrews, United Kingdom; © 2013 ACM; 10 pages.

* cited by examiner

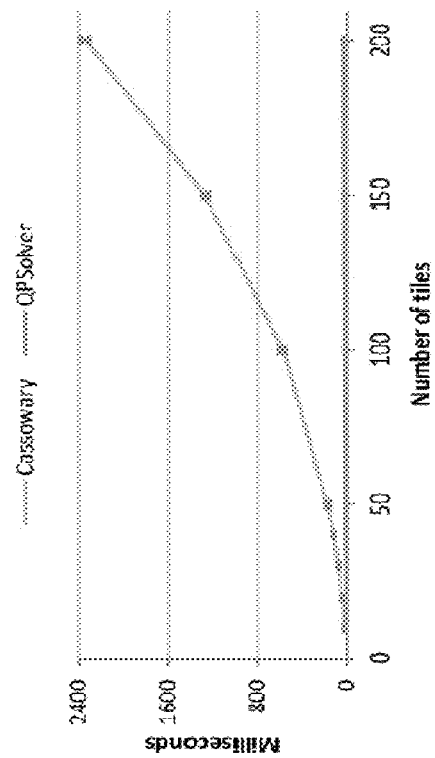
Figure 11
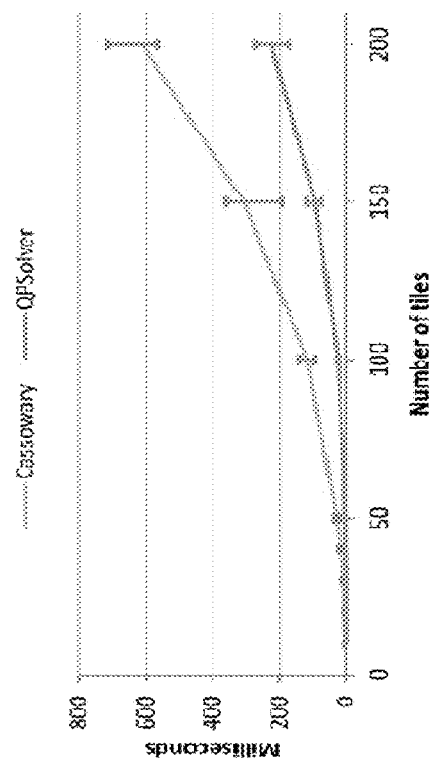

SCREEN LAYOUT MANAGER

TECHNICAL FIELD

The present invention relates to a software layout manager system for presentation of information on a screen of an electronic device or projected by an electronic device.

DESCRIPTION OF RELATED ART

A list of publications referred to in square brackets [xx] hereinafter is provided at the end of the detailed description. Information dashboards are a widely used means to present data at-a-glance. In [10], Few gives a formal definition of what a dashboard is: "A dashboard is a visual display of the most important information needed to achieve one or more objectives that has been consolidated on a single computer screen so it can be monitored at a glance." Their ability to communicate the data in a clear and efficient way depends not only on the way to represent the data but also on how visual elements are placed on the screen, providing the commonly named "dashboard layout". In many cases the dashboard layouts are predefined by the application but we are now in an era where the user wants more freedom. This freedom is today bounded by the applications using layout managers which either do not offer the needed flexibility or are too complex to be used by non-experts.

Dashboards are made of several pieces of information, such as metrics and key performance indicators (KPIs) [18], displayed as graphs, tables or even in a purely textual form. In the present description we also refer generally to these items as "visual elements". To design an effective dashboard that communicates clearly its data, one has to take care of several aspects such as choosing the appropriate display media depending on the kind of information and designing each table and graph properly [9, 31]. A complete guideline to designing effective dashboards can be found in [10].

There are a number of software products dedicated to creating dashboards, such as Tableau Software [30] and Qlik [26]. However dashboards are today used in virtually any application managing data; they include but are not limited to enterprise software (e.g., Salesforce, SAP), analytics tools (e.g., Google Analytics, New Relic) and even personal applications (e.g., Nike+). While most applications provide out-of-the-box hardcoded dashboards, the trend is to let users build their own dashboards. In the latter, the user has not only to choose the data to be displayed—and how to display it—but also to lay it out on the screen. Conventional layout managers do not offer the needed flexibility or are too complex for non-experts.

When developing a GUI, one usually uses a layout manager to avoid defining the position of each element in an absolute unit (e.g., in pixels). In this case the developer has to provide a set of simple layout specifications and the layout manager will then automatically compute the position of each element based on different factors (e.g., available space, element sizes, layout specifications). Many different types of layout managers exist and we can classify them into different categories:

i) Layout managers that are part of most GUI frameworks such as Java Swing [29], Windows Presentation Foundation [34] or Qt [27]. The Group layout enables elements to be placed next to each other, either horizontally of vertically. An evolution of this layout is the Flow layout which is basically similar to a horizontal group layout but with elements breaking into multiple rows if not enough space is available. In a Grid layout, elements are laid out in a 2-dimensional grid and they can span over several rows/columns. Moreover weights can be assigned to rows and columns to define which amount of space they can use proportionally. More advanced versions of the Grid layout, such as Masonry [21], try to automate the positioning of the elements on the grid.

ii) Frameworks such as Cocoa [7], CCSS [3], FWL [35] and the Auckland Layout Editor [37] allow the definition of constraint-based layouts. In such layouts the user defines a set of constraints in the form of linear equalities or inequalities. An example of constraint can be $x_1 = x_2$, where $x_i$ is the horizontal position of element i, to define that elements 1 and 2 must be left-aligned. Each constraint can be either hard (i.e., it must be satisfied) or soft (i.e., it can be violated if needed). Soft constraints basically represent preferences. Group or Grid layouts can be expressed as constraints as well but constraint-based layouts allow even more complex layouts.

iii) Finally, some more specialized layout managers exist. An example is Packery [25] which automatically lays out elements on a webpage and uses a bin-packing algorithm to minimize the needed amount of space. Other placement strategies are reviewed in [32].

FIGS. 1a and 1b illustrate the types of layouts usually available in dashboards: column-based (FIG. 1a) and row-based (FIG. 1b). These layouts are very simple to implement but they lack flexibility and changes are not necessarily intuitive or predictable to the user. For example in a column-based layout, adding an element to a column will change the position of elements only in that column such that an element that was next to it in another column may not be next to it anymore. If those elements are related, the user expects them to remain together or aligned To remain as easy as possible for the end-user, most dashboards use a layout based on rows or columns—basically a set of Group layouts.

A Grid layout as illustrated in FIG. 1c would provide a greater level of flexibility but would be more difficult for the user to build in order to ensure a aesthetically pleasing layout by preventing holes (i.e., zones in the layout without any element) and the persistence of the contiguity of the elements for predictability. This implies that when adding a row or column to the underlying grid, all adjacent elements have to be modified to change their row/column spanning.

Layout managers like Masonry or Packery would be easier for the user as they automate a significant part of the layout process but they have two big drawbacks: firstly these layout algorithms work well only if all elements are of the same size (or a multiple of it), otherwise the resulting layout contains many holes and its aesthetics suffer from it. Addressing the latter concern reduces the flexibility of these conventioal layout managers. Moreover, as the layout is performed mainly automatically, the result does not ensure that related visual elements placed next to each other stay that way as part of a meaningful group, losing therefore in intuitiveness or predictability to the user.

Constraint-based layouts offer the flexibility and predictability but defining all the different constraints is both a tedious and difficult task especially when constraints have to be defined manually as in OPUS [16], Lapidary [36] or GridStyleSheets (GSS) [14]. Some editors make the process easier [22, 19, 37] but they are made for GUI developers: in such tools constraints are still visible to the user to some extent so it is too complex to manage for a non-expert.

SUMMARY OF THE INVENTION

To overcome the above mentioned drawbacks, the aim of the invention is to provide a layout manager system and method for displaying elements on an electronic screen that is easy to define, flexible, predictable and visually coherent.

Easy to define may in particular include providing a layout manager enabling non-experts to easily and interactively build a dashboard and to place all visual elements at their optimal place on the screen.

Flexibility may in particular include providing a dashboard made of visual elements that may be of very different sizes: for instance a full graph requires more space and may have a different aspect ratio than a number displayed in a textual form.

Predictability may in particular include providing a dashboard where related visual elements are placed close to each other to form groups for instance according to the law of proximity of the Gestalt principles [33]. These groups should optimally be maintained when any modification is made (e.g., the dashboard is resized, a new visual element is added or removed).

Visually coherent aesthetics play an important part in GUI design as they deal with emotions that are critical for having a successful product [24]. A large part of aesthetics is related to the look and feel of the different visual elements but the visual coherence of the layout plays a role too. To have an aesthetic dashboard, it is advantageous to use the whole available space in a well balanced way and all visual elements are preferably be properly aligned [15]. This also ensures that the layout is more compact and easier to understand.

Objects of the invention are achieved by the system according to claim 1 and the method according to claim 15.

Disclosed herein is an electronic layout manager system, and a method for displaying a plurality of visual elements in different sections of a screen of an electronic device or of a screen image projected by an electronic device, said sections being in the form of assembled square or rectangular tiles of various sizes that in combination fill a square or rectangular screen surface area, the system comprising a layout manager program module configured to define the size and position of each of the tiles as a function of constraints stored in a memory of the system or calculated by an algorithm of the program module, the program module configured to recursively subdivide said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H), the program module configured to automatically resize, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height.

The automatic resizing may in an embodiment further include automatic resizing in a direction parallel to the added or subtracted partition of all said tiles aligned with the added or removed tile as a function of one or more of said constraints.

The program module may in an embodiment be configured to allow a user to add a new tile by selecting an existing tile to subdivide and a position where to place the new tile relative to the existing tile.

The selection of tile and position may in an embodiment comprises placing a screen cursor inside the selected existing tile and adjacent a selected vertical or horizontal partition of said selected existing tile and effecting a command, and wherein the program module is configured to add said new tile adjacent said selected horizontal or vertical partition upon receiving said command.

The constraints may in an embodiment include a minimum width and a minimum height of each tile and a preferred width and a preferred height of each tile.

The tile sizes may in an embodiment be optimized by minimizing a quadratic objective function.

The constraints may include for certain tiles a fixed size.

In an embodiment, weights for each constraint may be defined in order to express preferences in layout of tiles, the constraints with greater weights taking preference over the constraints with smaller weights, whereby a hard constraint is defined by setting its weight to very large number in comparison to weights attributed to soft constraints, said very large number being for instance at least 100 times greater than said weights attributed to soft constraints.

The program module may be configured to add weights to constraints in the objective function so as to solve the following equation:

$$\text{minimize } \Sigma_{i \in tiles} \text{weight}_i \times (w_1 - \text{preferred\_width}_i)^2$$

The program module may advantageously be configured to correct a spring effect in the width of tiles by adjusting the weight of a preferred width of a tile i in the objective function:

$$\text{weight}_i = \frac{1}{\text{number of tiles sharing the same left and right edges than tile } i}$$

and may be further configured to correct a spring effect in the height of tiles in a similar manner way but taking into account the top and bottom partitions.

In an embodiment, the program module is configured to generate constraints according to the following algorithm:

```
function GENERATE_CONSTRAINTS(node)
    if node is a leaf then
        if node is the tree root then
            constraints ← x_node = 0
            constraints ← y_node = 0
            tw ← FIRST_ROW_TILES(node)
            constraints ← Σ_{i∈tw} w_i = width
        constraints ← w_node ≥ minimum_width_node
        constraints ← h_node ≥ minimum_height_node
        constraints ← w_node ≈ preferred_width_node
        constraints ← h_node ≈ preferred_height_node
    else
        leftT ← FIRST_TILE(node.leftChild)
        rightT ← FIRST_TILE(node.rightChild)
        lw ← FIRST_ROW_TILES(node.leftChild)
        rw ← FIRST_ROW_TILES(node.rightChild)
        lh ← FIRST_COLUMN_TILES(node.leftChild)
```

```
    rh ← FIRST_COLUMN_TILES(node.rightChild)
    if node is an horizontal edge then
        constraints ← x_{rightT} = x_{leftT}
        constraints ← Σ_{i∈rw} w_i = Σ_{j∈lw} w_j
        constraints ← y_{rightT} = y_{leftT} + Σ_{i∈lh} h_i
    else if node is a vertical edge then
        constraints ← y_{rightT} = Y_{leftT}
        constraints ← Σ_{i∈rh} h_i = Σ_{j∈lh} h_j
        constraints ← x_{rightT} = x_{leftT} + Σ_{i∈lw} w_i
    GENERATE_CONSTRAINTS(node.leftChild)
    GENERATE_CONSTRAINTS(node.rightChild)
    return constraints.
```

The program module is configured to generate a set of constraints depending on the type of node, whereby, in an embodiment, if the node represents a horizontal partition H, the constraints include:

(i) a first tile of a sub-layout (Sa) above the horizontal partition (H) must be left-aligned with a first tile of the sub-layout (Sb) below the horizontal partition (H), the sub-layout (Sa) above the horizontal partition (H) being representable in a logic tree diagram by a first child of a first branch of a tree node (H) representing said horizontal partition; the sub-layout (Sb) below the horizontal partition (H) being representable by a first child of a second branch of the tree node (H), the first tile of a sub-layout being determined by the following algorithm:

```
function FIRST_TILE(node)
    if node is a leaf then
        return node
    else
        return FIRST_TILE(node.leftChild) ;
```

(ii) the sub-layout (Sa) above the horizontal partition (H) is of an equal width to the sub-layout (Sb) below the horizontal partition, the width of a sub-layout being equal to the sum of the widths of the tiles composing its first row; those tiles being selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles;
```

(iii) a distance between the first tiles of the both sub-layouts is equal to the height of the sub-layout above the partition, the height of a sub-layout being equal to the sum of the heights of the tiles composing its first column; those tiles being selected by way of the following algorithm:

```
function FIRST_COLUMN_TILES(node)
    if node is a leaf then
        tiles ← node
    else
        FIRST_COLUMN_TILES(node.leftChild)
        if node is a horizontal edge then
            FIRST_COLUMN_TILES(node.rightChild)
    return tiles.
```

The program module is configured to generate a set of constraints depending on the type of node, whereby, in an embodiment, if the node represents a vertical partition V, the constraints include:

(i) a first tile of a sub-layout to the left of the vertical partition (V) must be top-aligned with a first tile of the sub-layout to the right of the vertical partition (V), the sub-layout to the left of the vertical partition (V) being representable in a logic tree diagram by a first child of a first branch of a tree node (V) representing said vertical partition; the sub-layout to the right of the vertical partition (V) being representable by a first child of a second branch of the tree node (V) representing said vertical partition, the first tile of a sub-layout being determined by the following algorithm:

```
function FIRST_TILE(node)
    if node is a leaf then
        return node
    else
        return FIRST_TILE(node.leftChild) ;
```

(ii) the sub-layout to the left of the vertical partition (V) is of an equal height to the sub-layout to the right of the vertical partition, the height of a sub-layout being equal to the sum of the heights of the tiles composing its first column; those tiles being selected by way of the following algorithm:

```
function FIRST_COLUMN_TILES(node)
    if node is a leaf then
        tiles ← node
    else
        FIRST_COLUMN_TILES(node.leftChild)
        if node is a horizontal edge then
            FIRST_COLUMN_TILES(node.rightChild)
    return tiles;
```

(iii) a distance between the first tiles of the both sub-layouts is equal to the width of the sub-layout to the left of the partition, the width of a sub-layout being equal to the sum of the widths of the tiles composing its first row; those tiles being selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles.
```

The invention further encompasses a non-transient computer-readable medium having tangibly stored thereon instructions that, when executed by a processor, perform the method described herein.

The invention further encompasses a computing apparatus comprising an electronic display, a processor and a memory having stored thereon instructions that, when executed by the processor, perform the method described herein.

The layout manager according to the invention is advantageously particularly suitable for dashboards; it provides layouts based on a binary space partitioning (BSP) configured to allow the user to interactively build and modify them. In the invention, an optimal solution for such layouts is computed by defining how to compute the position and size of all visual elements in order for them to be as close as possible to their preferred size while respecting the arrangement decided by the user. This is achieved by automatically generating a set of constraints which are then solved to find the optimal solution. In an exemplary embodiment, the actual implementation may for instance be in the form of a lightweight constraint solver in JavaScript (in this instance named QPSolver) that can be embedded in a web application.

BRIEF DESCRIPTION OF THE DRAWINGS

For a better understanding of the invention, and to show how embodiments of the same may be carried into effect, reference will now be made, by way of example, to the accompanying schematic drawings in which:

FIG. 1A shows a column-based layout, FIG. 1B shows a row-based layout, and FIG. 1C shows a grid layout;

FIG. 10A is what we expect as a result if all tiles have the same preferred width; on FIG. 10B is the actual result with a quadratic optimization;

FIG. 11 is a schematic illustration of a performance comparison between Cassowary and a layout manager according to an embodiment of the invention (named QPSolver): on the left we compare the time it takes to generate and add the constraints to the solver and on the right the time it takes to solve the constraints; for each layout size we solved 100 random layouts and we plotted the median value as well as the 1st and 3rd quartiles.

DETAILED DESCRIPTION OF EXEMPLARY EMBODIMENTS

Defining a Layout

Figure 2A:
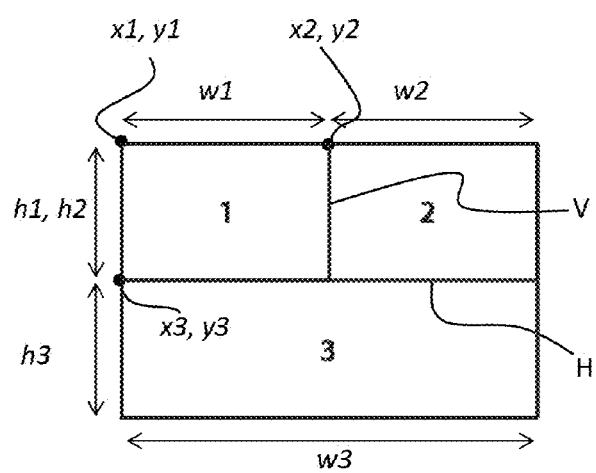
FIG. 2A is schematic illustration of a simple binary space partitioning (BSP) layout according to an embodiment of the invention and FIG. 2B its tree definition representation according to an embodiment of this invention, where H represents an horizontal partition and V a vertical partition.
Figure 2B:
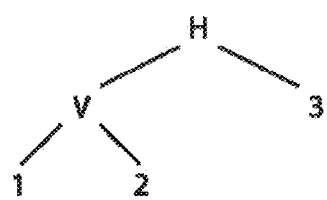

A layout manager according to embodiments of the invention provides a layout based on binary space partitioning (BSP) that offers the flexibility and predictability of a constraint-based layout but with the ease-of-use of a group-based layout. In a BSP layout, the whole available space represented by a rectangle is recursively subdivided by horizontal or vertical lines H, V—called partitions (or edges)—into smaller spaces—called tiles 1,2,3. A very simple binary space partitioning (BSP) layout and its tree definition representation is illustrated in FIG. 2 where H represents an horizontal partition and V a vertical partition. Each tile may contain, for instance, one visual element (e.g., a table or a graph) that is automatically resized to fill the available space. A BSP layout can be represented as a binary tree as shown in FIG. 2 with each node of the tree being an partition and each leaf a tile. A sub-layout is defined as the layout represented by a part of the tree, i.e., one of the children of a node. Two sub-layouts are defined as siblings if they share the same parent node.

Ease of Use

Figure 3:
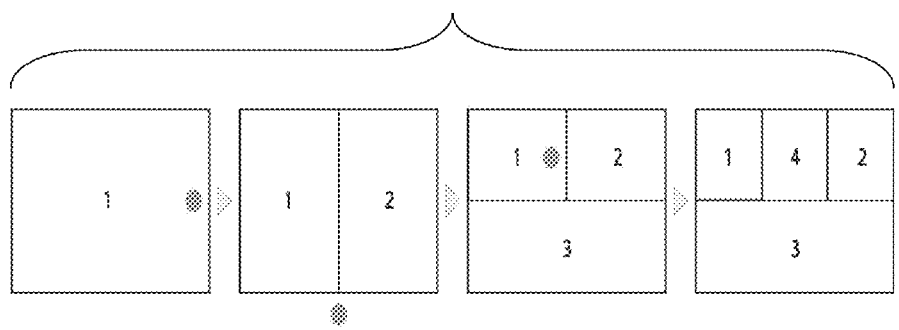
FIG. 3 is a schematic illustration according to an embodiment of this invention illustrating a process in which, in this specific example for illustrative purposes, the user builds a BSP layout by adding a tile at the right of tile 1, then one below the whole layout and finally the last one at the right of tile 1.
Figure 4A:
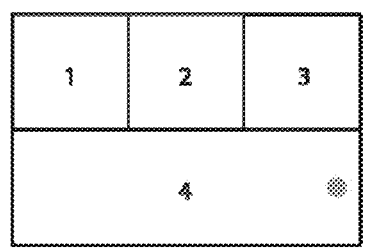
FIG. 4A is a schematic illustration according to an embodiment of this invention illustrating a process in which a tile is added on the right of tile 4 whereby node 4 is replaced by a node V (vertical partition) which has node 4 and the newly created tile as children.
Figure 4B:
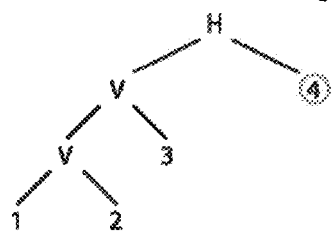
FIG. 4B illustrates a tree definition representation of the process of FIG. 4A.
Figure 4B:
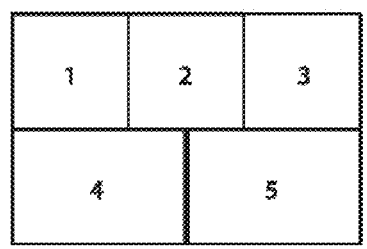
Figure 4B:
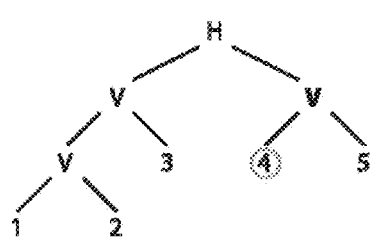
Figure 5:
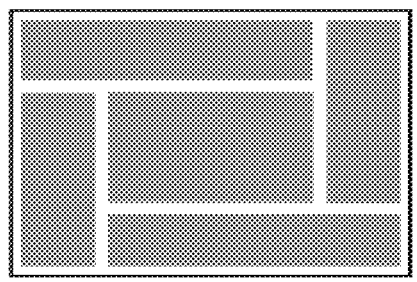
FIG. 5 illustrates a layout that cannot be represented by a binary tree and is therefore not a BSP layout.

A BSP layout can be easily defined in an interactive way by a non-expert user thanks to the recursive nature of the partitioning. To add a new tile, the user has only to choose which tile to subdivide and where to place the new tile relatively to it—on the left, right, top or bottom of it—as shown in FIG. 3. The user can also choose to place the new tile on the left, right, top or bottom of the overall layout without subdividing an existing tile. In FIG. 3, the user builds a layout by adding a tile at the right of tile 1, then one below the whole layout and finally the last one at the right of tile 1.

If we consider the tree representation of the layout, adding a new tile is a simple operation as shown on FIG. 4. If one takes tile i as a reference:

Adding a new tile x at its top means replacing node i by a node H—a horizontal partition—with the left child being tile x and the right child tile i.

Adding a new tile x at its bottom means replacing node i by a node H with the left child being tile i and the right child tile x.

Adding a new tile x at its left means replacing node i by a node V—a vertical partition—with the left child being tile x and the right child tile i.

Adding a new tile x at its right means replacing node i by a node V with the left child being tile i and the right child tile x.

The same principles apply when adding a new tile not relatively to an existing one but to the overall layout. In that case the root node of the tree is replaced by an partition with its children being the new tile and the former tree. Removing a tile follows the opposite process: the parent node of the removed tile is replaced by its other child. Sometimes the user may want to move a tile: this case can be simply seen as the succession of the removal of the said tile followed by its addition somewhere else in the layout. In FIG. 4, adding a tile on the right of tile 4 means replacing node 4 by a node V (vertical partition) which has node 4 and the newly created tile as children.

Flexibility

Figure 1A:
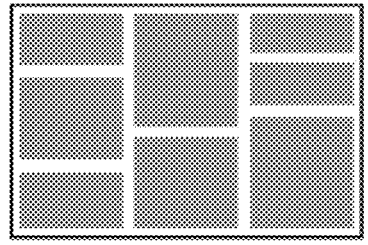
FIGS. 1A-1C illustrate various types of layouts available in information dashboards for display on a screen.
Figure 1B:
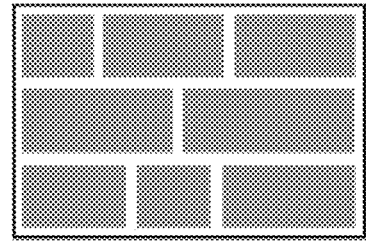
Figure 1C:
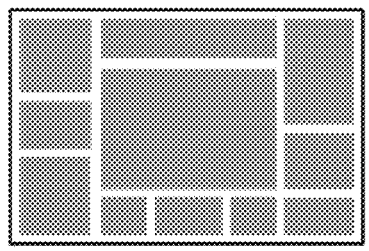

A BSP layout enables us to arrange tiles based on rows and columns in a manner similar to traditional layout managers used for dashboards. As there is no limitation on the size- and the depth-of the tree representing the layout, one can define more advanced and complex layouts than the one illustrated in FIGS. 1a, 1b. It may be noted however that not all tile arrangements based on a grid can be modeled by a binary tree. For example, the layout illustrated in FIG. 1C can not be represented by a binary tree and is therefore not a BSP layout.

Predictability

To be predictable, a layout should preferably ensure that tiles displayed close to each other—hence forming a group—remain close to each other no matter which modification is done on the layout. Such modifications include the addition or removal of a tile and the resizing of the whole layout. In a BSP layout, all tiles belonging to a group are actually tiles located in the same sub-layout, or said otherwise, in the same sub-tree in the tree representation. We have seen above that adding or removing a tile is a simple operation on the tree representation of the layout and has therefore a very limited impact: no sub-layout other than the one in which the modification is done is impacted. This is why all groups remain together. When the layout is resized, the visual arrangement of tiles will not be affected: the binary tree representing the layout is independent from the size of the layout. If it changes, the same tree applies, hence the tiles arrangement is the same and the only change will be the size of each tile.

Visual Coherence

To be aesthetic a dashboard should preferably fill the whole horizontal available space. A BSP layout uses the whole available space by definition as it is constructed by recursively subdividing this space. It also ensures that all tiles are consistently aligned as each sub-layout is aligned with its sibling. This is also important to ensure that the layout remains as compact as possible and is easy to understand.

Another preferable feature to obtain an aesthetic dashboard is to ensure that the size of each tile is big enough so that its content has enough space to be displayed and the whole dashboard feels natural and well-balanced. The binary partitioning provides an arrangement of the tiles but tile sizes are determined by the position of the partitions. For this reason a minimum size for each tile should be set as well as a preferred size which represents the size in which the contained visual element looks the best for the user. A method for defining the tile sizes is addressed in the following sections.

Generating Constraints

Once a layout has been defined by defining a tree representation as described above, the size and position of each tile is computed. While this task is easy for a human being, doing it automatically is more difficult. If one considers the simple layout depicted in FIG. 2, we can identify two types of constraints: constraints describing the position of the tiles and constraints describing their size.

Tile Position Constraints

Some constraints define the position of the different tiles. We can define the position of a tile by referring to a point on the tile as long as this point is used consistently. In the present, we use the position of a corner of the tile, for instance the top left corner, to define the position of the tile. For the layout illustrated in FIG. 2, tile 1 is the first of the layout so we have the constraints $x_1=0$ where $x_i$ is the horizontal position of tile i
$y_1=0$ where $y_i$ is the vertical position of tile i Then we can define the position of the other tiles relative to the first one $x_2=x_1+w_1$ where $w_i$ is the width of tile i
$y_2=y_1$
$x_3=x_1$
$y_3=y_1+h_1$ where $h_i$ is the height of tile i Tile Size Constraints Each tile has a minimum and preferred size, so for the layout depicted in FIG. 2, we have the constraints $$w_i \geq \text{minimum\_width}_i$$

$$h_i \geq \text{minimum\_height}_i$$

$$w_i \approx \text{preferred\_width}_i$$

$$h_i \approx \text{preferred\_height}_i$$

$$\forall i \in [1,2,3]$$

where a≈b means that a should have a value as close as possible to the value of b. Additionally the following constraints are derived from the layout $$h_1=h_2$$

$$w_3=w_1+w_2$$

Finally, if the layout should fill all the space horizontally, we add the constraint $$w_1+w_2=W \text{ where } W \text{ is the available width.}$$

Automatically Generating Constraints

Referring to FIG. 6, if sub-layouts above (Sa) and below (Sb) the horizontal partition H should be left-aligned, their first tiles should be left-aligned which leads to the constraint $x_4=x_1$.

Figure 7A:
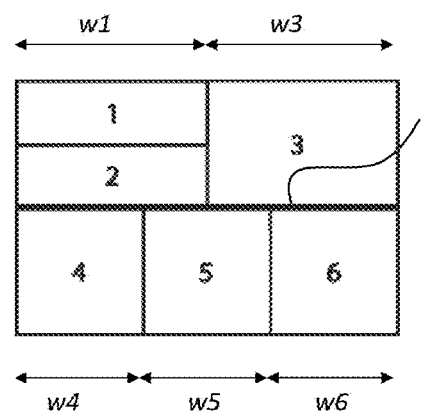
FIG. 7A is a schematic illustration of the example of FIG. 6 illustrating widths of the sub-layouts above and below the partition that are equal, leading to the constraint w4+w5+w6=w1+w3.
Figure 7B:
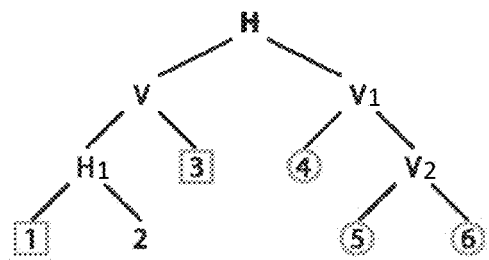
FIG. 7B illustrates a tree definition representation of the layout of FIG. 7A.

Referring to FIG. 7, if the widths of the sub-layouts above and below the horizontal partition H should be equal, this leads to the constraint $w_4+w_5+w_6=w_1+w_3$.

Figure 8A:
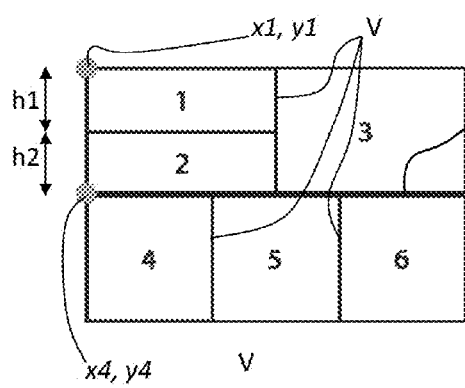
FIG. 8A is a schematic illustration of the example of FIG. 6 illustrating tile 4 positioned below the sub-layout located above the partition leading to the constraint y4=y1+h1+h2.
Figure 8B:
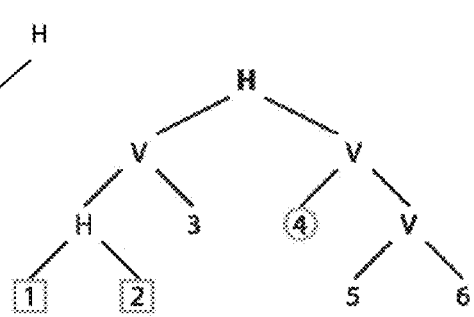
FIG. 8B illustrates a tree definition representation of the layout of FIG. 8A.

Referring to FIG. 8, if Tile 4 should be positioned below the sub-layout located above the horizontal partition H, this leads to the constraint $y_4=y_1+h_1+h_2$.

Figure 6A:
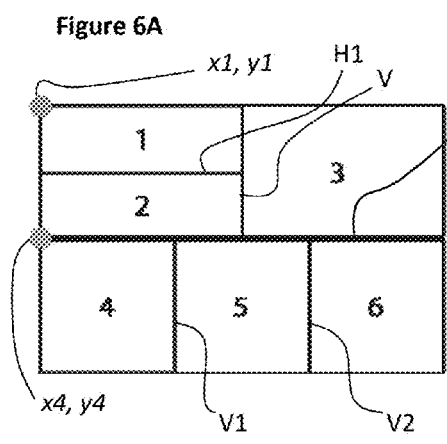
FIG. 6A is a schematic illustration according to an embodiment of this invention illustrating sub-layouts above and below a horizontal partition and FIG. 6B illustrates a tree definition representation of the layout of FIG. 6A.
Figure 6B:
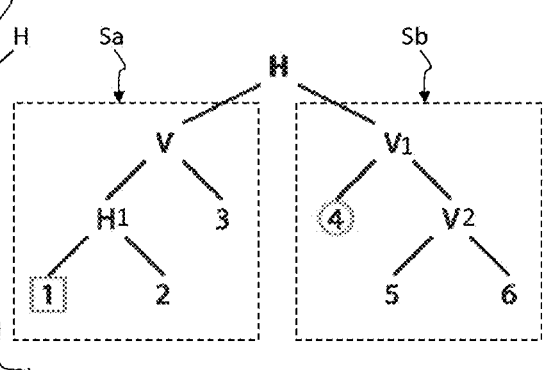

Based on the tree definition of a layout, it is possible to automatically generate all constraints with a unique deep-first pre-order traversal of the tree. For each visited tree node, a set of constraints may be generated depending on the type of node. If the node represents a horizontal partition H, the constraints may be as follows (see FIGS. 6 and 7 as an example):

i) The first tile (1) of the sub-layout (Sa) above the horizontal partition (H) must be left-aligned with the first tile (4) of the sub-layout (Sb) below the horizontal partition (H) (see FIG. 6a). The sub-layout (Sa) above a horizontal partition (H) is represented in a logic tree diagram (see FIG. 6b) by the first child (1) of the first branch of the tree node (H) representing said horizontal partition, which may be defined as the first child of the tree node (H); the sub-layout (Sb) below the horizontal partition (H) is represented by the first child (4) of the second branch of the tree node (H), which may be defined as the second child of the tree node (H). The first tile of a sub-layout is determined by the following algorithm:

```
function FIRST_TILE(node)
    if node is a leaf then
        return node
    else
        return FIRST_TILE(node.leftChild)
``` ii) The sub-layout (Sa) above the horizontal partition (H) should be of an equal width to the sub-layout (Sb) below the horizontal partition. The width of a sub-layout is equal to the sum of the widths of the tiles composing its first row; those tiles can be selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles
``` iii) The distance between the first tiles of the both sub-layouts should be equal to the height of the sub-layout above the partition (see FIG. 8). The height of a sub-layout is equal to the sum of the heights of the tiles composing its first column; those tiles can be selected by way of the following algorithm:

```
function FIRST_COLUMN_TILES(node)
    if node is a leaf then
        tiles ← node
    else
        FIRST_COLUMN_TILES(node.leftChild)
        if node is a horizontal edge then
            FIRST_COLUMN_TILES(node.rightChild)
    return tiles.
```

Three similar constraints may be generated in a similar manner for an partition that is vertical. When a leaf is reached, constraints are added regarding the minimum and preferred width and height of the corresponding tile. If the tile is the first one of the whole layout, two additional constraints are added to set its position to (0,0). Finally a last constraint is added to ensure that the layout will use all the space available horizontally. The whole algorithm is the following:

```
function GENERATE_CONSTRAINTS(node)
    if node is a leaf then
        if node is the tree root then
            constraints ← x_node = 0
            constraints ← y_node = 0
```

```
        tw ← FIRST_ROW_TILES(node)
        constraints ← Σ_{i∈tw} w_i = width
    constraints ← w_node ≥ minimum_width_node
    constraints ← h_node ≥ minimum_height_node
    constraints ← w_node ≈ preferred_width_node
    constraints ← h_node ≈ preferred_height_node
else
    leftT ← FIRST_TILE(node.leftChild)
    rightT ← FIRST_TILE(node.rightChild)
    lw ← FIRST_ROW_TILES(node.leftChild)
    rw ← FIRST_ROW_TILES(node.rightChild)
    lh ← FIRST_COLUMN_TILES(node.leftChild)
    rh ← FIRST_COLUMN_TILES(node.rightChild)
    if node is an horizontal edge then
        constraints ← x_{rightT} = x_{leftT}
        constraints ← Σ_{i∈rw} w_i = Σ_{j∈lw} w_j
        constraints ← y_{rightT} = y_{leftT} + Σ_{i∈lh} h_i
    else if node is a vertical edge then
        constraints ← y_{rightT} = y_{leftT}
        constraints ← Σ_{i∈rh} h_i = Σ_{j∈lh} h_j
        constraints ← x_{rightT} = x_{leftT} + Σ_{i∈lw} w_i
    GENERATE_CONSTRAINTS(node.leftChild)
    GENERATE_CONSTRAINTS(node.rightChild)
return constraints.
```

Solving the Layout

The previous section describes an example of how constraints can be automatically generated based on the tree definition of a layout. The layout may then be calculated by determining values for variables x, y, w and h for each tile of the layout. These values should respect all equality and inequality constraints (hard constraints) but they should also optimally define tile sizes as close as possible to their preferred values that represent soft constraints. To find an optimal solution, the soft constraints may, in an advantageous embodiment, be represented by a scalar objective function that is being minimized while respecting the hard constraints.

One of the simplest objective functions that may be implemented is a linear one such as minimize $\Sigma_{i \in tiles} |w_i - pw_i| + |h_i - ph_i|$ where $pw_i$ and $ph_i$ are the preferred width and height of tile i.

Figure 9A:
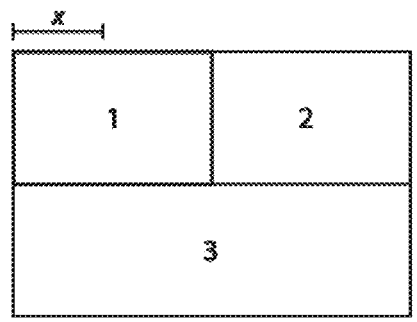
FIGS. 9A and 9B are schematic illustrations according to an embodiment of this invention illustrating all tiles subject to a constraint of having a preferred width of x, whereby that both layouts are equally optimal using a linear objective function. The FIG. 9A layout looks however more natural to the human eye than the FIG. 9B layout because tiles 1 and 2 have the same width.
Figure 9B:
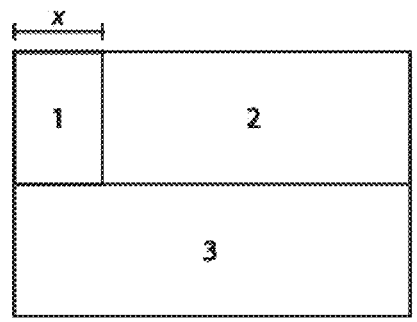

Cassowary [4] is based on such an approach and uses an improved version of the simplex algorithm [8]. Using a linear objective function effectively solves the layout but may provide a layout which is aesthetically not natural for a human in the sense that the human would not be expected to come up with that solution if done by hand as described in [38]. If one considers the simple layout described in FIG. 2 and one assumes that the preferred width of all tiles is set to x, the solution displayed on the left-hand side of FIG. 9 looks the most natural to a human eye notwithstanding that neither tile has a width corresponding to the soft constraint x. In effect, there is no reason why two tiles with the same soft constraint, in this example a preferred width, should be displayed with different widths [33]. However, if we optimize the layout with a linear objective function, we may obtain the solution displayed on the right-hand side of FIG. 9 as the objective function returns the same value for both solutions.

In order to obtain an aesthetically natural layout, according to a feature of the invention, each tile individually is set as close as possible to its preferred size. This can be done by minimizing a quadratic objective function such as minimize $\Sigma_{i \in tiles}(w_i - pw_i)^2 + (h_i - ph_i)^2$ where $pw_i$ and $ph_i$ are the preferred width and height of tile i.

The type of layout and associated constraints according to embodiments of the invention advantageously have the following properties enabling the automated calculation process (solver) to be simple and light on the use of computing resources:

There is no cyclic dependencies in constraints (a cyclic dependency would be something similar to width$_i$=width$_j$, width$_j$=width$_k$ and width$_k$=width$_i$)

The widths and heights of the tiles are independent; it means they can be optimized separately (e.g. one finds first a solution for the widths and then for the heights).

Once an optimal solution for the widths and heights is found by solving the tile size constraints, finding a solution for the tile position constraints is trivial as it can be reduced to solving a set of linear equations.

Therefore an overall approach to determine the layout may be summarized by the following steps:
1. Find the optimal solution for all widths
2. Find the optimal solution for all heights
3. Solve the linear equations for the positions Optimizing Tile Sizes The first step in solving a layout is to find optimal values for the width and height of all tiles. This may be done, according to an advantageous embodiment of the invention, by minimizing the quadratic objective function described above and resolving a set of equality and inequality constraints. Let us consider the layout described in FIG. 2 and assume the following values:

$\forall i \in [1,2,3]$: minimum_width$_i$=100 preferred_width$_1$=100 preferred_width$_2$=200 preferred_width$_3$=400

$W$=500

To find the optimal solution, we want to find values for $w_1$, $w_2$, $w_3$ that minimize$(w_1-100)^2+(w_2-200)^2+(w_3-400)^2$ subject to $w_1+w_2=500$ $w_1+w_2-w_3=0$ $w_1>=100$ $w_2>=100$ $w_3>=100$ Quadratic programming deals with optimization problems which can be expressed as:

$$\text{minimize} \; d^T x + \frac{1}{2} x^T D x$$

$$\text{subject to} \; A^T x \begin{Bmatrix} = \\ \geq \end{Bmatrix} b$$

where x and d are n-vectors, D is an n×n symmetric positive definite matrix and $x^T$ denotes the transpose of x. A is a n×m matrix and b is a m-vector and they represent all equality and inequality constraints.

For our sample problem described above, we end up with $$D = \begin{pmatrix} 1 & 0 & 0 \\ 0 & 1 & 0 \\ 0 & 0 & 1 \end{pmatrix}, x = \begin{pmatrix} w1 \\ w2 \\ w3 \end{pmatrix} \text{ and } d = \begin{pmatrix} 100 \\ 200 \\ 400 \end{pmatrix}$$

to represent the objective function and $$A = \begin{pmatrix} 1 & 1 & 1 & 0 & 0 \\ 1 & 1 & 0 & 1 & 0 \\ 0 & -1 & 0 & 0 & 1 \end{pmatrix} \text{ and } b = \begin{pmatrix} 500 \\ 0 \\ 100 \\ 100 \\ 100 \end{pmatrix}$$

to represent the equality and inequality constraints—with the first two constraints being equality constraints and the others inequality constraints. To find the optimal values for vector x, one may use for instance the dual method of Goldfarb and Idnani [12, 13], which in our example gives as a result $w_1$=200, $w_2$=300 and $w_3$=500. The same approach may be used to find optimal values for variables $h_i$ representing the heights.

Over-Constrained Layouts

Layouts can be over-constrained, whereby no solution respecting all hard constraints can be found. This can happen for instance when the overall width constraint is the one of the form $\Sigma w_i = W$ where W is the overall desired width. In this situation where the content does not fit inside the available width, a desirable outcome would be to have the layout take the minimum necessary space even if it implies that the user will have to scroll the viewport. This may be resolved by relaxing the constraint by increasing the value of W until a solution can be found. Given the performance of the solving algorithm, it is easy to do it incrementally and solve the layout each time. Also, some heuristics and strategies can be put in place to speed up the search of the minimal required width that satisfies all constraints.

Tiles with Fixed Size

As mentioned above tiles may have minimum and preferred sizes. In some cases however one may want certain tiles to have a fixed size. The natural way of proceeding would be to add hard constraints of the form w=fixed_width$_i$. The problem is that we would quickly end up with an over-constrained layout; it would even happen when the layout consists of a single tile having a fixed width smaller than the overall available width.

In an embodiment, constraint hierarchies may be defined in order to specify which constraints we accept to violate in order to find an adequate result. The notion of constraint heirarchies is per se known and presented in article [6].

In another embodiment, weights for each constraint are defined in order to express preferences in layout of tiles. The notion of weighted constraints is per se known from articles [5, 28]. In weighted constraints, a hard constraint may be defined by setting its weight to large number that approximates infinity ($\infty$). In this method weights are added to constraints in the objective function so as to solve the following equation:

minimize $\Sigma_{i \in tiles}$weight$_i \times (w_i - $preferred_width$_i)^2$ where weight$_i$ is set to 1 for a normal preferred size and to a large number that approximates infinity for the purposes of the calculation. We can represent the problem similarly as described above by adapting the D matrix to $$D = \begin{pmatrix} \text{weight}_1 & 0 & \cdots & 0 \\ 0 & \text{weight}_2 & \cdots & 0 \\ \vdots & \vdots & \ddots & \vdots \\ 0 & 0 & \cdots & \text{weight}_n \end{pmatrix}$$

and solving it with the same algorithm.

Spring Effect

Figure 10A:
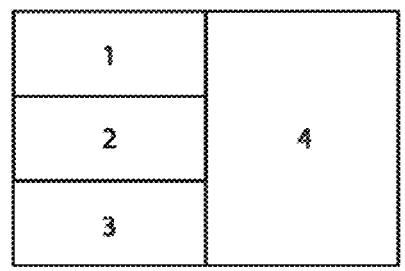
FIGS. 10A and 10B are schematic illustrations according to an embodiment of this invention illustrating a spring effect.
Figure 10B:
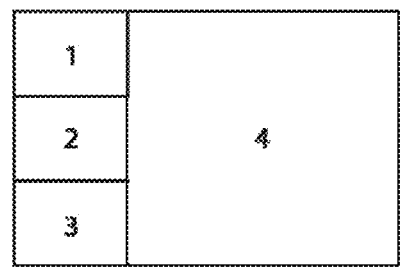

Tile sizes that are optimized with a quadratic objective function as described above may experience a spring effect as described in [38] and illustrated in FIG. 10. FIG. 10 illustrates a spring effect whereby on the left is what is expected if all tiles have the same preferred width and on the right is the actual result with a quadratic optimization. In this example there are four tiles having the same preferred width. One would expect a result as shown on the left hand side because as all tiles have the same preferred width, one expects them to have the same actual width (Gestalt law of equality [33]). However one obtains the result on the right hand side. Preferred size constraints can be seen as springs pulling or pressing tiles to their preferred size. In this example we have two columns, the first one with three constraints/springs and the second with only one. The resulting force is therefore three times bigger for the first column.

This spring effect can be corrected by adjusting the weight of the preferred size in the objective function. When optimizing the widths, the weights could be calculated as $$\text{weight}_i = \frac{1}{\text{number of tiles sharing the same left and right edges than tile } i}$$

and in a same way when optimizing the heights but with taking into account the top and bottom partitions.

Determining Tile Positions

The next step is to determine the position of all tiles to find a value for their x and y variables respecting the tile position constraints described above. As the sizes have already been optimized, the w and h variables can be substituted by their corresponding values. In the example based on FIG. 2, assuming all tiles having a height of 100, this gives us $x_1 = 0$ $y_1 = 0$ $x_2 = x_1 + 200$ $y_2 = y_1$ $x_3 = x_1$ $y_3 = y_1 + 100$ These are a set of linear equations that can be represented in the form $Ax = b$ where x and b are m-vectors and A is an m×n matrix with m representing the number of variables and n the number of equations. In this example we have:

$$A = \begin{pmatrix} 1 & 0 & 0 & 0 & 0 & 0 \\ 0 & 0 & 0 & 1 & 0 & 0 \\ -1 & 1 & 0 & 0 & 0 & 0 \\ -1 & 0 & 1 & 0 & 0 & 0 \\ -1 & 0 & 1 & 0 & 0 & 0 \\ 0 & 0 & 0 & 1 & -1 & 0 \\ 0 & 0 & 0 & -1 & 0 & 1 \end{pmatrix}, x = \begin{pmatrix} x_1 \\ x_2 \\ x_3 \\ y_1 \\ y_2 \\ y_3 \end{pmatrix} \text{ and } b = \begin{pmatrix} 0 \\ 0 \\ 200 \\ 0 \\ 0 \\ 100 \end{pmatrix}$$

Using the Gaussian elimination algorithm [1] to solve the equations, we get $x_1=0$, $y_1=0$, $x_2=200$, $y_2=0$, $x_3=0$ and $y_3=100$.

Implementation and Performance

FIG. 11 illustrates a performance comparison between a known solver Cassowary for layout management and a solver according to an embodiment of the invention using the methods described above (named QPSolver in the illustration). On the left we compare the time it takes to generate and add the constraints to the solver and on the right the time it takes to solve the constraints. For each layout size we solved 100 random layouts and we plotted the median value as well as the 1st and 3rd quartiles.

The constraint solver according to the invention embodiment is based on the above described approach but implemented purely in JavaScript in order to be able to use the layout manager in web applications. In this example we are comparing it with Cassowary [4] because it is the most popular solver for constraint-based GUI layouts (used for example by Apple in OS X and iOS) and an implementation in JavaScript exists.

The test methodology was the following: we based the tests on layouts with 10, 20, 30, 40, 50, 100, 150 and 200 tiles. For each layout size, we generated 100 random layouts that we solved with Cassowary and QPSolver and we recorded two points of measure: the time it takes to generate and add the constraints to the solver and the time it takes to solve these constraints to find an optimal solution. The tests were performed with Mozilla Firefox version 32.0.3 running on Windows® 7 on an Intel® Core™ i7-2600 (3.4 GHz). The results, displayed in FIG. 11, show important differences between Cassowary and QPSolver.

The algorithm to generate the constraints is the same used for both solvers so the difference shown in the first chart is only due to the addition of the constraints to the solver. In the case of the invention embodiment QPSolver, adding a constraints only means editing some matrices hence the dramatically better performance. On the second chart we can notice that the invention embodiment QPSolver is significantly faster than the conventional solver Cassowary for solving the constraints even if it uses a quadratic optimization instead of a linear one. QPSolver can be lighter and faster than Cassowary because it doesn't need to deal with complex issues Cassowary has to (e.g., cyclic dependencies between constraints): QPSolver is tailored to be used for BSP layouts where constraints have been automatically generated.

It is also worth noting that, besides being fast, the invention embodiment QPSolver also has a lightweight implementation in terms of lines of code (around 1,500 versus around 4,600 for Cassowary). This has its importance because web applications will have to download the code that will then be run in the browser: less lines of code means a faster download.

LIST OF PRIOR PUBLICATIONS/DISCLOSURES

[1] Atkinson, K. E. An Introduction to Numerical Analysis, 2 ed. John Wiley & Sons, 1989.

[2] Avrahami, G., Brooks, K. P., and Brown, M. H. A two-view approach to constructing user interfaces. SIGGRAPH Comput. Graph. 23, 3 (July 1989), 137-146.

[3] Badros, G. J., Borning, A., Marriott, K., and Stuckey, P. Constraint cascading style sheets for the web. In Proceedings of the 12th annual ACM symposium on User interface software and technology, ACM (1999), 73-82.

[4] Badros, G. J., Borning, A., and Stuckey, P. J. The Cassowary linear arithmetic constraint solving algorithm. ACM Transactions on Computer-Human Interaction 8, 4 (December 2001), 267-306.
[5] Bistarelli, S., Montanari, U., and Rossi, F. Semiring-based constraint satisfaction and optimization. Journal of the ACM (JACM) 44, 2 (1997), 201-236.
[6] Borning, A., Freeman-Benson, B., and Wilson, M. Constraint hierarchies. LISP and Symbolic Computation 5, 3 (1992), 223-270.
[7] Cocoa. https://developer.apple.com/technologies/mac/cocoa.html.
[8] Dantzig, G. Linear Programming and Extensions. Rand Corporation Research Study. Princeton Univ. Press, Princeton, N.J., 1963.
[9] Few, S. Show Me The Numbers: Designing tables and graphs to enlighten, vol. 1. Analytics Press Oakland, Calif., 2004.
[10] Few, S. Information Dashboard Design: Displaying data for at-a-glance monitoring. Analytics Press, 2013.
[11] Fletcher, R. Practical Methods of Optimization; (2nd Ed.). Wiley-Interscience, New York, N.Y., USA, 1987.
[12] Goldfarb, D., and Idnani, A. Dual and primal-dual methods for solving strictly convex quadratic programs. In Numerical Analysis. Springer, 1982, 226-239.
[13] Goldfarb, D., and Idnani, A. A numerically stable dual method for solving strictly convex quadratic programs. Mathematical Programming 27, 1 (1983), 1-33.
[14] GridStyleSheets (GSS). http://gridstylesheets.org.
[15] Heim, S. G. The Resonant Interface: HCI foundations for interaction design. Pearson/Addison Wesley, 2008.
[16] Hudson, S. E., and Mohamed, S. P. Interactive specification of flexible user interface displays. ACM Transactions on Information Systems (TOIS) 8, 3 (1990), 269-288.
[17] Jamil, N. Constraint solvers for user interface layout. CoRR abs/1401.1031 (2014).
[18] Kaplan, R. S., and Norton, D. The balanced scorecard: Measures that drive performance. Harvard Business Review 70, 1 (January-February 1992), 71-79.
[19] Karsenty, S., Weikart, C., and Landay, J. A. Inferring graphical constraints with Rockit. In Proceedings of the INTERACT'93 and CHI'93 Conference on Human Factors in Computing Systems, ACM (1993), 531.
[20] Marriott, K., and Chok, S. S. QOCA: A constraint solving toolkit for interactive graphical applications. Constraints 7, 3-4 (2002), 229-254.
[21] Masonry. http://masonry.desandro.com.
[22] Myers, B. A., and Buxton, W. Creating highly-interactive and graphical user interfaces by demonstration. In ACM SIGGRAPH Computer Graphics, vol. 20, ACM (1986), 249-258.
[24] Norman, D. A. Emotional Design: Why we love (or hate) everyday things. Basic books, 2004.
[25] Packery. http://packery.metafizzy.co.
[26] Qlik. http://www.qlik.com.
[27] Qt. http://qt-project.org.
[28] Schiex, T., Fargier, H., Verfaillie, G., et al. Valued constraint satisfaction problems: Hard and easy problems. IJCAI (1) 95 (1995), 631-639.
[29] Java Swing. http://docs.oracle.com/javase/tutorial/uiswing.
[30] Tableau Software. http://www.tableausoftware.com.
[31] Tufte, E. R. The Visual Display of Quantitative Information, 2 ed. Graphics Press, 2001.
[32] Vanderdonckt, J., Ouedraogo, M., and Ygueitengar, B. A comparison of placement strategies for effective visual design. In Proceedings of the Conference on People and Computers IX, HCI '94, Cambridge University Press (New York, N.Y., USA, 1994), 125-143.
[33] Wertheimer, M. Laws of organization in perceptual forms. A Source Book of Gestalt Psychology (1938), 71-88.
[34] Windows Presentation Foundation. http://msdn.microsoft.com/en-us/library/ms754130.aspx.
[35] Yanagida, T., Nonaka, H., and Kurihara, M. Personalizing graphical user interfaces on flexible widget layout. In Proceedings of the 1st ACM SIGCHI Symposium on Engineering Interactive Computing Systems, EICS '09, ACM (New York, N.Y., USA, 2009), 255-264.
[36] Zanden, B. V., and Myers, B. A. The lapidary graphical interface design tool. In Proceedings of the SIGCHI Conference on Human Factors in Computing Systems, ACM (1991), 465-466.
[37] Zeidler, C., Lutteroth, C., Sturzlinger, W., and Weber, G. The Auckland Layout Editor: An improved GUI layout specification process. In Proceedings of the 26th Annual ACM Symposium on User Interface Software and Technology, UIST '13, ACM (New York, N.Y., USA, 2013), 343-352.
[38] Zeidler, C., Lutteroth, C., and Weber, G. Constraint solving for beautiful user interfaces: how solving strategies support layout aesthetics. In Proceedings of the 13th International Conference of the NZ Chapter of the ACM's Special Interest Group on Human-Computer Interaction, ACM (2012), 72-79.

The invention claimed is:

1. An electronic layout manager system for displaying a plurality of visual elements in different sections of a screen of an electronic device or of a screen image projected by an electronic device, said sections being in the form of assembled square or rectangular tiles of various sizes that in combination fill a square or rectangular screen surface area, the system comprising:
a processor;
a layout manager program module containing executable computer-readable instructions by the processor in order to define the size and position of each of the tiles as a function of constraints, and to recursively subdivide said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H), the execution of the computer-readable instructions automatically resizes, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height, wherein the execution of the computer-readable instructions generates constraints according to the following algorithm:

```
function GENERATE_CONSTRAINTS(node)
    if node is a leaf then
        if node is the tree root then
            constraints ← x_node = 0
            constraints ← y_node = 0
            tw ← FIRST_ROW_TILES(node)
            constraints ← Σ_{i∈rw} w_i = width
        constraints ← w_node ≥ minimum_width_node
        constraints ← h_node ≥ minimum_height_node
        constraints ← w_node ≈ preferred_width_node
        constraints ← h_node ≈ preferred_height_node
    else
        leftT ← FIRST_TILE(node.leftChild)
        rightT ← FIRST_TILE(node.rightChild)
        lw ← FIRST_ROW_TILES(node.leftChild)
        rw ← FIRST_ROW_TILES(node.rightChild)
        lh ← FIRST_COLUMN_TILES(node.leftChild)
        rh ← FIRST_COLUMN_TILES(node.rightChild)
        if node is an horizontal edge then
            constraints ← x_rightT = x_leftT
            constraints ← Σ_{i∈rw} w_i = Σ_{j∈lw} w_j
            constraints ← y_rightT = y_leftT + Σ_{i∈lh} h_i
        else if node is a vertical edge then
            constraints ← y_rightT = y_leftT
            constraints ← Σ_{i∈rh} h_i = Σ_{j∈lh} h_j
            constraints ← x_rightT = x_leftT + Σ_{i∈lw} w_i
        GENERATE_CONSTRAINTS(node.leftChild)
        GENERATE_CONSTRAINTS(node.rightChild)
    return constraints.
```

2. An electronic layout manager system for displaying a plurality of visual elements in different sections of a screen of an electronic device or of a screen image projected by an electronic device, said sections being in the form of assembled square or rectangular tiles of various sizes that in combination fill a square or rectangular screen surface area, the system comprising:
  a processor;
  a layout manager program module containing executable computer-readable instructions by the processor in order to define the size and position of each of the tiles as a function of constraints, and to recursively subdivide said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H), the execution of the computer-readable instructions automatically resizes, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height, wherein the execution of the computer-readable instructions generates a set of constraints depending on the type of node, whereby if the node represents a horizontal partition H, the constraints include:

(i) a first tile of a sub-layout (Sa) above the horizontal partition (H) must be left-aligned with a first tile of the sub-layout (Sb) below the horizontal partition (H), the sub-layout (Sa) above the horizontal partition (H) being representable in a logic tree diagram by a first child of a first branch of a tree node (H) representing said horizontal partition; the sub-layout (Sb) below the horizontal partition (H) being representable by a first child of a second branch of the tree node (H), the first tile of a sub-layout being determined by the following algorithm:

```
function FIRST_TILE(node)
    if node is a leaf then
        return node
    else
        return FIRST_TILE(node.leftChild) ;
```

(ii) the sub-layout (Sa) above the horizontal partition (H) is of an equal width to the sub-layout (Sb) below the horizontal partition, the width of a sub-layout being equal to the sum of the widths of the tiles composing its first row; those tiles being selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles ;
```

(iii) a distance between the first tiles of the both sub-layouts is equal to the height of the sub-layout above the partition, the height of a sub-layout being equal to the sum of the heights of the tiles composing its first column; those tiles being selected by way of the following algorithm:

```
function FIRST_COLUMN_TILES(node)
    if node is a leaf then
        tiles ← node
    else
        FIRST_ COLUMN _TILES(node.leftChild)
        if node is a horizontal edge then
            FIRST_ COLUMN _TILES(node.rightChild)
    return tiles.
```

3. An electronic layout manager system for displaying a plurality of visual elements in different sections of a screen of an electronic device or of a screen image projected by an electronic device, said sections being in the form of assembled square or rectangular tiles of various sizes that in combination fill a square or rectangular screen surface area, the system comprising:
  a processor;
  a layout manager program module containing executable computer-readable instructions by the processor in order to define the size and position of each of the tiles as a function of constraints, and to recursively subdivide said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H), the execution of the computer-readable instructions automatically resizes, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height, wherein the execution of the computer-readable instructions generates a set of constraints depending on the type of node, whereby if the node represents a vertical partition V, the constraints include:

(i) a first tile of a sub-layout to the left of the vertical partition (V) must be top-aligned with a first tile of the sub-layout to the right of the vertical partition (V), the sub-layout to the left of the vertical partition (V) being representable in a logic tree diagram by a first child of a first branch of a tree node (V) representing said vertical partition; the sub-layout to the right of the vertical partition (V) being representable by a first child of a second branch of the tree node (V) representing said vertical partition, the first tile of a sub-layout being determined by the following algorithm:

```
function FIRST_TILE(node)
    if node is a leaf then
        return node
    else
        return FIRST_TILE(node.leftChild) ;
```

(ii) the sub-layout to the left of the vertical partition (V) is of an equal height to the sub-layout to the right of the vertical partition, the height of a sub-layout being equal to the sum of the heights of the tiles composing its first column; those tiles being selected by way of the following algorithm:

```
function FIRST_COLUMN_TILES(node)
    if node is a leaf then
        tiles ← node
    else
        FIRST_ COLUMN _TILES(node.leftChild)
        if node is a horizontal edge then
            FIRST_ COLUMN _TILES(node.rightChild)
    return tiles;
```

(iii) a distance between the first tiles of the both sub-layouts is equal to the width of the sub-layout to the left of the partition, the width of a sub-layout being equal to the sum of the widths of the tiles composing its first row; those tiles being selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles.
```

4. A method of displaying a plurality of visual elements in different sections of a screen of an electronic device or of a screen image projected by an electronic device, said sections being in the form of assembled square or rectangular tiles of various sizes that in combination fill a square or rectangular screen surface area, the method comprising:

providing an electronic layout manager program module containing executable computer-readable instructions by a processor in order to define the size and position of each of the tiles as a function of constraints, executing the computer-readable instructions, said execution including:

recursively subdividing said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H);

automatically resizing, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height, wherein the execution of the computer-readable instructions generates constraints according to the following algorithm:

```
function GENERATE_CONSTRAINTS(node)
    if node is a leaf then
        if node is the tree root then
            constraints ← x_{node} = 0
            constraints ← y_{node} = 0
            tw ← FIRST_ROW_TILES(node)
            constraints ← Σ_{i∈rw} w_i = width
        constraints ← w_{node} ≥ minimum_width_{node}
        constraints ← h_{node} ≥ minimum_height_{node}
        constraints ← w_{node} ≈ preferred_width_{node}
        constraints ← h_{node} ≈ preferred_height_{node}
    else
        leftT ← FIRST_TILE(node.leftChild)
        rightT ← FIRST_TILE(node.rightChild)
        lw ← FIRST_ROW_TILES(node.leftChild)
        rw ← FIRST_ROW_TILES(node.rightChild)
        lh ← FIRST_COLUMN_TILES(node.leftChild)
```

-continued

```
        rh ← FIRST_COLUMN_TILES(node.rightChild)
        if node is an horizontal edge then
              constraints ← x_{rightT} = x_{leftT}
              constraints ← Σ_{i∈rw} w_i = Σ_{j∈lw} w_j
              constraints ← y_{rightT} = y_{leftT} + Σ_{i∈lh} h_i
        else if node is a vertical edge then
              constraints ← y_{rightT} = y_{leftT}
              constraints ← Σ_{i∈rh} h_i = Σ_{j∈lh} h_j
              constraints ← x_{rightT} = x_{leftT} + Σ_{i∈lw} w_i
        GENERATE_CONSTRAINTS(node.leftChild)
        GENERATE_CONSTRAINTS(node.rightChild)
    return constraints.
```

5. A method of displaying a plurality of visual elements in different sections of a screen of an electronic device or of a screen image projected by an electronic device, said sections being in the form of assembled square or rectangular tiles of various sizes that in combination fill a square or rectangular screen surface area, the method comprising:
  providing an electronic layout manager program module containing executable computer-readable instructions by a processor in order to define the size and position of each of the tiles as a function of constraints,
  executing the computer-readable instructions, said execution including:
  recursively subdividing said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H);
  automatically resizing, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height, wherein the execution of the computer-readable instructions generates a set of constraints depending on the type of node, whereby if the node represents a horizontal partition H, the constraints include:
  (i) a first tile of a sub-layout (Sa) above the horizontal partition (H) must be left-aligned with a first tile of the sub-layout (Sb) below the horizontal partition (H), the sub-layout (Sa) above the horizontal partition (H) being representable in a logic tree diagram by a first child of a first branch of a tree node (H) representing said horizontal partition; the sub-layout (Sb) below the horizontal partition (H) being representable by a first child of a second branch of the tree node (H), the first tile of a sub-layout being determined by the following algorithm:

```
function FIRST_TILE(node)
    if node is a leaf then
        return node
    else
        return FIRST_TILE(node.leftChild) ;
```

(ii) the sub-layout (Sa) above the horizontal partition (H) is of an equal width to the sub-layout (Sb) below the horizontal partition, the width of a sub-layout being equal to the sum of the widths of the tiles composing its first row; those tiles being selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles ;
```

(iii) a distance between the first tiles of the both sub-layouts is equal to the height of the sub-layout above the partition, the height of a sub-layout being equal to the sum of the heights of the tiles composing its first column; those tiles being selected by way of the following algorithm:

```
function FIRST_COLUMN_TILES(node)
    if node is a leaf then
        tiles ← node
    else
        FIRST_ COLUMN _TILES(node.leftChild)
        if node is a horizontal edge then
            FIRST_ COLUMN _TILES(node.rightChild)
    return tiles.
```

6. A method of displaying a plurality of visual elements in different sections of a screen of an electronic device or of a screen image projected by an electronic device, said sections being in the form of assembled square or rectangular tiles of various sizes that in combination fill a square or rectangular screen surface area, the method comprising:
  providing an electronic layout manager program module containing executable computer-readable instructions by a processor in order to define the size and position of each of the tiles as a function of constraints,
  executing the computer-readable instructions, said execution including:
  recursively subdividing said screen surface area by horizontal and vertical partitions (H, V) to create a binary space partitioning (BSP) layout containing horizontal and vertical partitions representable by a logical binary tree where each node of the tree represents a partition and each leaf of the tree represents a tile, whereby each addition of a tile comprises either adding a vertical partition (V) or alternatively adding a horizontal partition (H) and each subtraction of a tile comprises either subtracting a vertical partition (V) or alternatively subtracting a horizontal partition (H);
  automatically resizing, as a function of one or more of said constraints, at least one or more tiles aligned with the added or removed tile to fill the space that was occupied by said one or more resized tiles before said addition or subtraction, said aligned tiles sharing a common partition orthogonal to the added or subtracted partition, said automatic resizing occurring in a direction orthogonal to the added or subtracted partition whereby when a vertical partition is added or subtracted said automatically resized tiles are resized in width and when a horizontal partition is added or subtracted said automatically resized tiles are resized in height, wherein the execution of the computer-readable instructions generates a set of constraints depending on the type of node, whereby if the node represents a vertical partition V, the constraints include:

(i) a first tile of a sub-layout to the left of the vertical partition (V) must be top-aligned with a first tile of the sub-layout to the right of the vertical partition (V), the sub-layout to the left of the vertical partition (V) being representable in a logic tree diagram by a first child of a first branch of a tree node (V) representing said vertical partition; the sub-layout to the right of the vertical partition (V) being representable by a first child of a second branch of the tree node (V) representing said vertical partition, the first tile of a sub-layout being determined by the following algorithm:

```
function FIRST_TILE(node)
    if node is a leaf then
        return node
    else
        return FIRST_TILE(node.leftChild) ;
```

(ii) the sub-layout to the left of the vertical partition (V) is of an equal height to the sub-layout to the right of the vertical partition, the height of a sub-layout being equal to the sum of the heights of the tiles composing its first column; those tiles being selected by way of the following algorithm:

```
function FIRST_COLUMN_TILES(node)
    if node is a leaf then
        tiles ← node
    else
        FIRST_ COLUMN _TILES(node.leftChild)
        if node is a horizontal edge then
            FIRST_ COLUMN _TILES(node.rightChild)
    return tiles;
```

(iii) a distance between the first tiles of the both sub-layouts is equal to the width of the sub-layout to the left of the partition, the width of a sub-layout being equal to the sum of the widths of the tiles composing its first row; those tiles being selected by way of the following algorithm:

```
function FIRST_ROW_TILES(node)
    if node is a leaf then
        tiles ← node
    else
        FIRST_ROW_TILES(node.leftChild)
        if node is a vertical edge then
            FIRST_ROW_TILES(node.rightChild)
    return tiles.
```

* * * * *